United States Patent [19]
Gaulke et al.

[11] Patent Number: 5,802,470
[45] Date of Patent: Sep. 1, 1998

[54] AUTOMATED WIRELESS-CALL COMPLETION USING A PAGING NETWORK

[75] Inventors: David Alan Gaulke; Thomas Charles Hanson, both of Boulder; Richard Paul Moleres, Louisville, all of Colo.

[73] Assignee: AT&T Corp, Middletown, N.J.

[21] Appl. No.: 584,416

[22] Filed: Jan. 11, 1996

[51] Int. Cl.⁶ .................................................... H04Q 7/22
[52] U.S. Cl. ............................................. 455/426; 455/422
[58] Field of Search .............................. 455/556, 574, 455/435, 426, 420, 419, 418, 31.3, 31.2, 461; 379/210, 211, 212, 213

[56] References Cited

U.S. PATENT DOCUMENTS

| | | | |
|---|---|---|---|
| 4,922,518 | 5/1990 | Gordon et al. | 455/31.2 |
| 5,117,449 | 5/1992 | Metroka et al. | 455/552 |
| 5,148,473 | 9/1992 | Freeland et al. | 455/556 |
| 5,153,903 | 10/1992 | Eastmond et al. | 455/458 |
| 5,175,758 | 12/1992 | Levanto et al. | 455/458 |
| 5,201,067 | 4/1993 | Grube et al. | 455/556 |
| 5,202,912 | 4/1993 | Breeden et al. | 455/465 |
| 5,247,700 | 9/1993 | Wohl et al. | 455/552 |
| 5,311,570 | 5/1994 | Grimes et al. | 455/417 |
| 5,398,280 | 3/1995 | MacConnell | 379/93.25 |
| 5,414,750 | 5/1995 | Bhagat et al. | 455/414 |

OTHER PUBLICATIONS

S. Warren, "Wireless Computer Telephony", *Computer Telephony*, vol. 3, Issue 9 (9–95), pp. 70–79.

Primary Examiner—Dwayne D. Bost
Assistant Examiner—Myron K. Wyche

[57] ABSTRACT

In a cellular telephone system (FIG. 1), a pager (122) is associated with a cellular phone (121) that is normally kept turned off and thus not drawing power from its battery (513). When an incoming call for the cellular phone arrives at a cellular exchange (103) and the exchange determines that the cellular phone is not registered with a base station (107–109), a paging system (105) is caused to transmit an incoming-call-indicative paging signal to the pager. Receipt of this paging signal at the pager either causes the user of the pager and the cellular phone to turn on the cellular phone, or causes the pager to turn on the cellular phone automatically via associated circuitry (502, 515). Activation causes the cellular phone to register with a base station, whereupon the cellular exchange extends the incoming call to the cellular phone through that base station. If the incoming call is not answered, or when the incoming call is completed, the paging system is caused to transmit a second paging signal to the pager. Receipt of the second paging signal at the pager leads to the cellular phone being turned off again. The cellular phone can therefore normally be turned off without fear of missing incoming calls. Battery power of the cellular phone is thus conserved.

8 Claims, 6 Drawing Sheets

AUTOMATED WIRELESS-CALL COMPLETION USING A PAGING NETWORK

CROSS-REFERENCE TO RELATED APPLICATION

This application relates in subject matter to application of Gaulke et al. entitled "Pager-Controlled Wireless Radiotelephone", filed on even date herewith and assigned to the same assignee.

TECHNICAL FIELD

This invention relates to paging and wireless radiotelephone services and equipment.

BACKGROUND OF THE INVENTION

Both paging systems and wireless radiotelephone systems are well known in the art. Paging systems are typically one-way radio communications systems that transmit rather powerful signals from a paging exchange to cover a large geographical area—such as an entire state or region, for example—with the broadcast in order to alert a person possessing a pager anywhere in that geographical area and to send a short message, such as a call request or a telephone number, to the pager's display. In contrast, wireless (e.g., cellular) radiotelephone systems are two-way radio communications systems that transmit rather weak signals at different frequencies from a plurality of base stations to cover a small area—a cell—around each base station with the transmissions. A mobile wireless radiotelephone communicates with the base station of whatever cell it happens presently to be located in via like rather weak signal transmissions to receive and to originate wireless telephone calls. In traditional cellular systems, each base station constantly engages all cellular telephones in its cell in specific two-way communications, called "registration", whereby the present location of any cellular phone is determined and incoming calls for that cellular phone can be directed by the cellular exchange to the base station that is presently serving that cellular phone. Many users of cellular phones have continued to use pagers, which has led some manufacturers to combine both devices into a single unit.

Because of the continuous two-way transmissions involved in registration, both the transmitter and the receiver of a turned-on wireless radiotelephone are active and consuming energy. Quite often, wireless radiotelephones operate on battery-supplied energy, and the transmitter drains significant amounts of energy from the battery. Many users of battery-powered wireless radiotelephones turn on their wireless radiotelephones only when making outgoing calls, in order to conserve battery life. And quite often, users simply forget to turn their wireless radiotelephones on. Consequently, it happens all too often that a user of a wireless radiotelephone misses incoming calls because the user's wireless radiotelephone is turned off and the exchange cannot complete the incoming calls to the wireless radiotelephone. In contrast, pagers have no transmitter (or at least no constantly-active transmitter) to drain their batteries of power, and their receivers consume only small amounts of power. Consequently, users typically keep their pagers turned on all of the time.

SUMMARY OF THE INVENTION

This invention is directed to solving this problem of the prior-art wireless radiotelephone systems. According to the invention, a wireless call is completed as follows. In response to a call incoming for a wireless radiotelephone, a paging signal is transmitted to a pager that is associated with the wireless radiotelephone. In response to receipt of the paging signal at the pager, the wireless radiotelephone is enabled—e.g., either manually by the user of the pager and the wireless radiotelephone, or automatically by the pager—to receive the incoming call. Preferably, in response to the incoming call, an attempt is first made to extend the call to the wireless radiotelephone, and only in response to failure of the attempt is the paging signal transmitted. Subsequently to the transmitting of the paging signal, the incoming call is extended, or attempted again to be extended, to the enabled wireless radiotelephone. Preferably, in response to either the extended incoming call not being answered at the wireless radiotelephone, or the extended incoming call being answered at the wireless radiotelephone and subsequently being terminated, a second paging signal is transmitted to the pager. In response to receipt of the second paging signal at the pager, the wireless radiotelephone is disabled. Illustratively, the wireless radiotelephone is enabled and disabled by being activated—turned on—and deactivated—turned off—respectively, by means of being connected to and disconnected from, respectively, a source of power, such as a battery.

Advantageously, the wireless radiotelephone can thus be enabled, activated, whenever there is an incoming call for the wireless radiotelephone, simply by sending to the associated pager a paging signal indicative of the incoming call. This allows the wireless radiotelephone to be kept in a disabled, deactivated, condition and not draining battery power at the times when the wireless radiotelephone is not in use, without missing incoming calls. Since the wireless radiotelephone can be deactivated in a like manner as it is activated, the invention can advantageously ensure that the wireless radiotelephone is active only when it is in use.

These and other advantages and features of the invention will become more apparent from the following description of an illustrative embodiment of the invention, taken together with the drawing.

BRIEF DESCRIPTION OF THE DRAWING

FIGS. 3 and 6–7 are a flow diagram of the operations of the system of FIG. 1 implementing the second illustrative embodiment of the invention.

DETAILED DESCRIPTION

Figure 1:
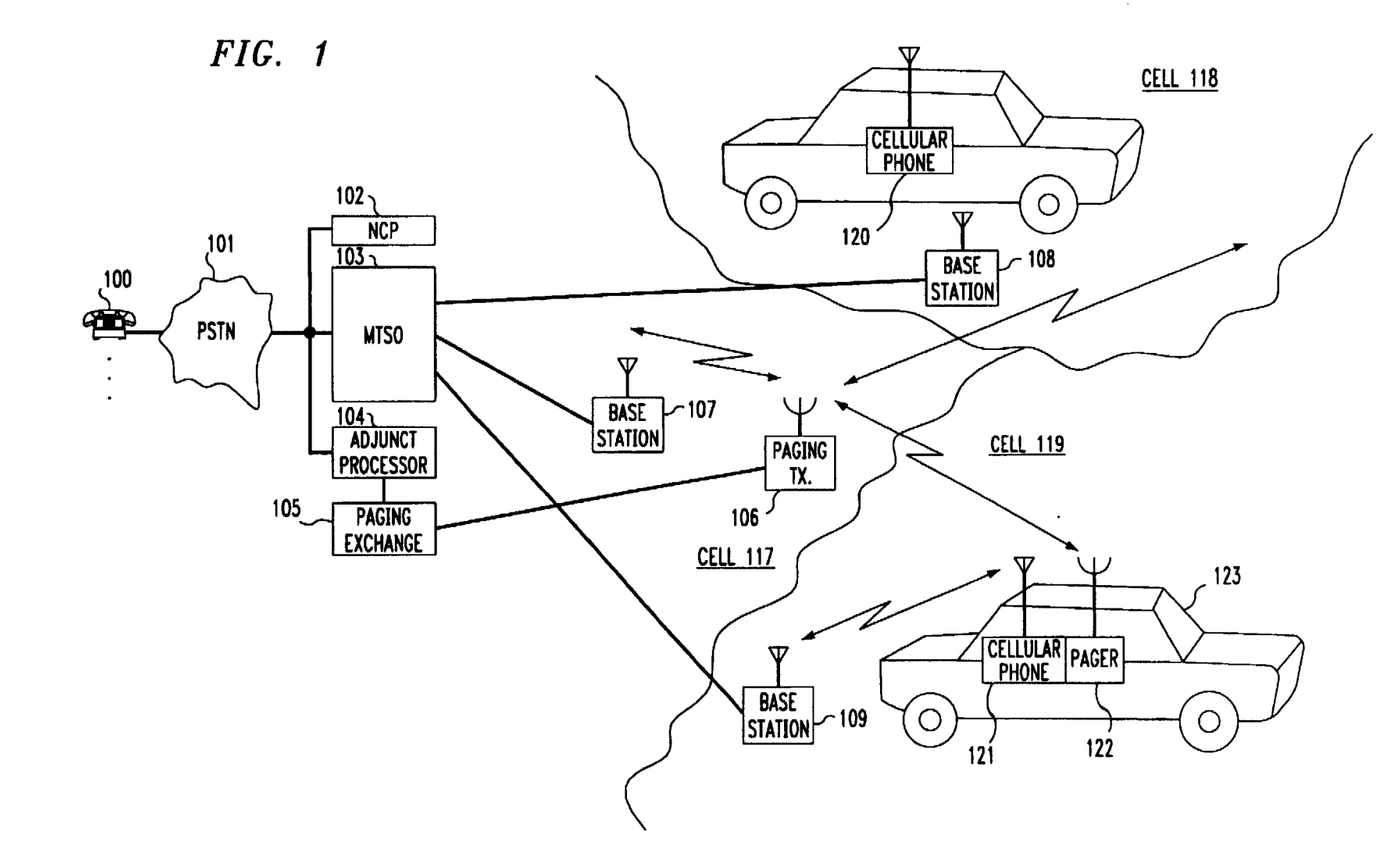
FIG. 1 is a block diagram of an illustrative telecommunications system that embodies an illustrative implementation of the invention.

FIG. 1 shows an illustrative telecommunications system. The telecommunications system comprises a cellular system, such as the AT&T Autoplex® system, that conventionally includes a mobile telephone system office (MTSO) 103 that serves as a wireless call exchange and provides wireless call processing and call routing services, a network control point (NCP) 102 that is connected to MTSO 103 and serves as a database of information about the configuration and present status of the cellular system, a plurality of base stations 107–109 connected to MTSO 103 and each providing wireless call services to cellular telephones 120–121 that are presently located in its cell 117–119, respectively. The telecommunications system of FIG. 1 further comprises a paging system that conventionally includes a paging exchange 105 that provides paging services to pagers, such as a pager 122, through at least one paging transmitter 106. The geographical area covered by a paging transmitter is typically large compared to the area of a cell, and encompasses a plurality of cells. The telecommunications system of FIG. 1 further comprises a landline telephone system that conventionally includes the public service telephone network (PSTN) 101 that interconnects a plurality of telephones, such as telephone 100. To provide call capability between landline telephones such as telephone 100 and cellular telephones 120–121, MTSO 103 is conventionally interconnected with PSTN 101. As described so far, the telecommunications system of FIG. 1 is conventional. According to the invention, however, at least some cellular system users, such as user 123, are equipped with both a cellular telephone 121 and a pager 122, and the telecommunications system further includes an adjunct processor 104 that is connected to MTSO 103, NCP 102, and paging exchange 105, and that provides for cellular-call completion with the aid of the paging system.

Figure 2:
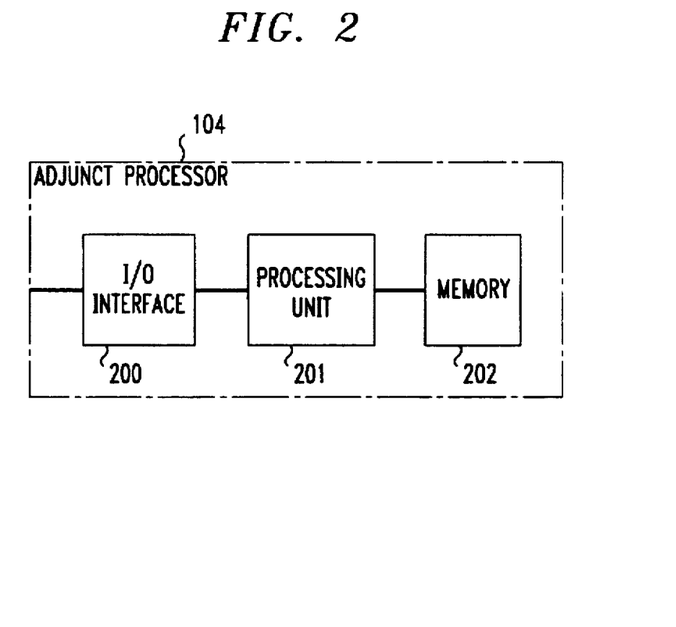
FIG. 2 is a block diagram of an adjunct processor of the system of FIG. 1.
Figure 3:
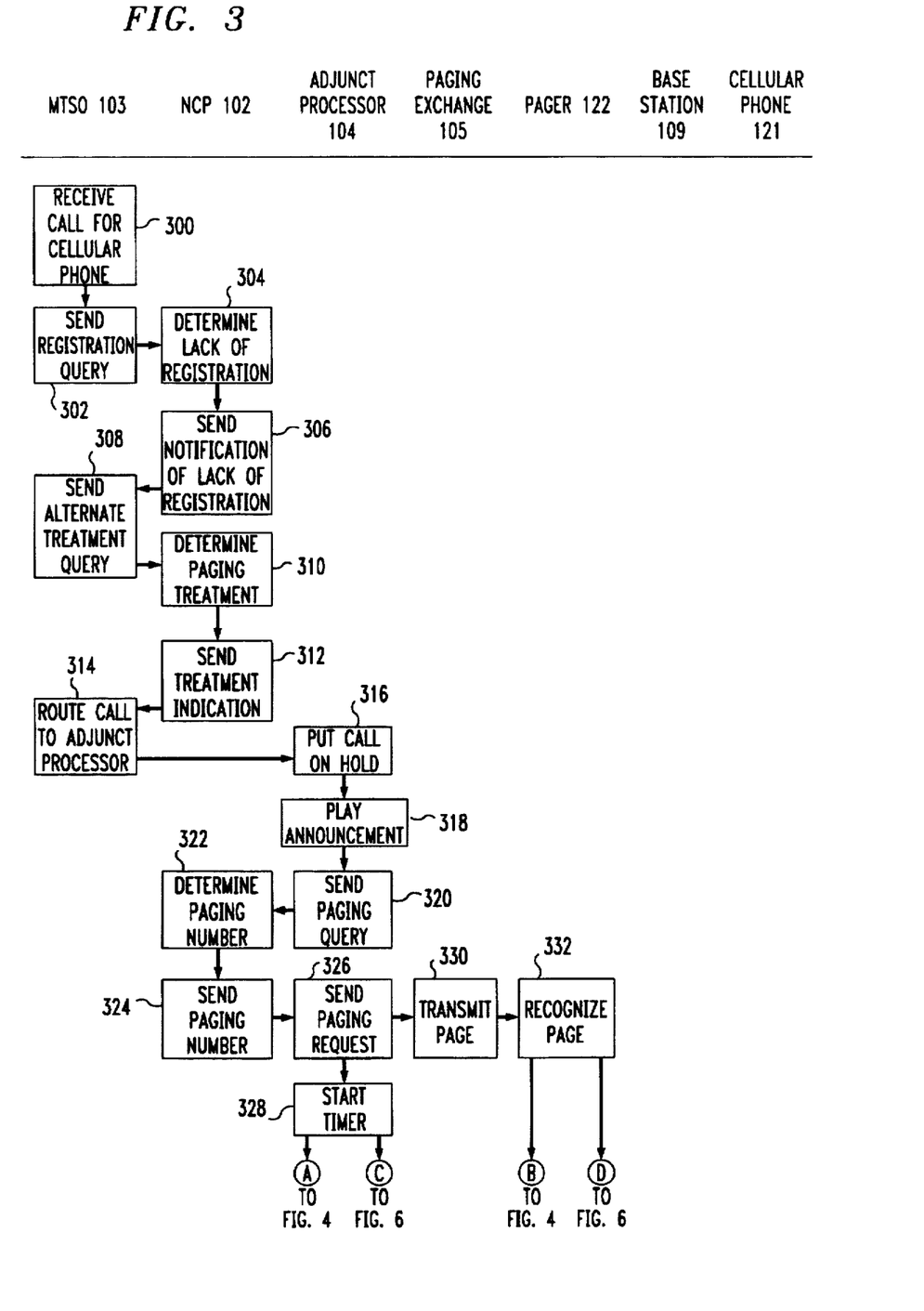
FIGS. 3–4 are a flow diagram of the operations of the system of FIG. 1 implementing a first illustrative embodiment of the invention.
Figure 4:
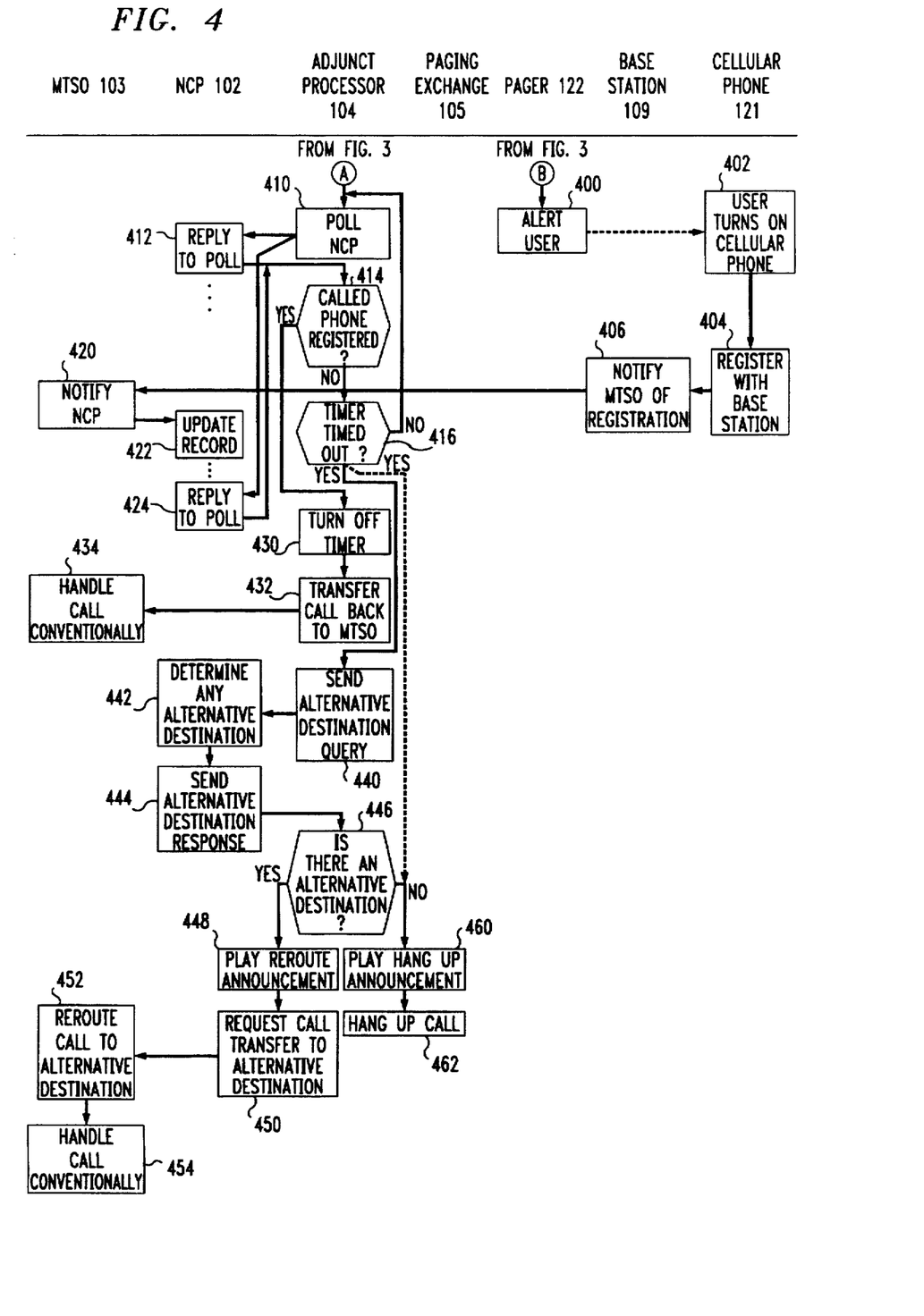

As shown in FIG. 2, adjunct processor 104 is a general-purpose storedprogram controlled computer that includes a memory 202 for storing control programs, a processing unit 201 connected to memory 202 for executing the control programs, and an input and output (I/O) interface 200 for enabling processing unit 201 to communicate with MTSO 103, NCP 102, and paging exchange 105. Adjunct processor 104 is illustratively the AT&T Conversant® system. The control programs in memory 202 implement the adjunct-processor 104 functionality flowcharted in FIGS. 3–4. Alternatively, the control programs in memory 202 may be stored in and executed by MTSO 103, whereby MTSO 103 effects the functionality of adjunct processor 104 and adjunct processor 104 is not needed. FIGS. 3–4 show the operations of the entire telecommunications system of FIG. 1 that implement a first illustrative embodiment of the invention.

As shown in FIG. 3, when MTSO 103 receives a call incoming for a cellular phone 121, either from a landline telephone 100 via PSTN 101 or from another cellular phone 120, at step 300, it attempts to extend the call to cellular phone 121. First, MTSO 103 sends a query containing the called number to NCP 102, at step 302, to determine if the called cellular phone 121 is registered with any base station 107–109, and if so, which one. NCP 102 responds to the query by searching its data to determine if called cellular phone 121 is registered, at step 304. If called cellular phone 121 is registered, it is able to receive the incoming call. So NCP 102 conventionally sends the information back to MTSO 103 in a query response, and the MTSO conventionally extends the call to called cellular phone 121 via the one of the base stations with which cellular phone 121 is registered. However, if NCP 102 finds at step 304 that called cellular phone 121 is presently not registered with any base station, it is not able to receive the incoming call and the attempt at extending the call to cellular phone 121 cannot be completed, and NCP 102 notifies MTSO 103 thereof, at step 306. In response, MTSO 103 sends another query to NCP 102 inquiring whether alternative call treatment is being provided for this cellular phone 121, at step 308. Alternative treatment may include a call-coverage path, such as connecting the call to the called party's mailbox in a voice messaging system (not shown). According to the invention, the data in NCP 102 do provide for alternative call treatment for cellular phone 121, and the first alternative call destination in the coverage path of cellular phone 121 is specified to be adjunct processor 104. NCP 102 makes this determination, at step 310, and sends notice thereof to MTSO 103, at step 312. In response, MTSO 103 routes and connects the call to adjunct processor 104, at step 314. Adjunct processor 104 receives the call and puts it on hold, at step 316. While the call is on hold, adjunct processor 104 plays a pre-recorded announcement to the caller informing the caller to stay on the line while the called party is paged, at step 318. Adjunct processor 104 also sends a paging query for called cellular phone 121 to NCP 102, at step 320. NCP 102 finds the pager number of pager 122 that is associated with cellular phone 121 in its records for cellular phone 121, at step 322, and sends this pager number to adjunct processor 104, at step 324. In response, adjunct processor 104 sends a paging request to paging exchange 105, at step 326. The paging request contains the pager number of pager 122 and a request to send it an incoming-call indication. Adjunct processor 104 also starts a timer, at step 328, that gives cellular phone 121 a predetermined amount of time to become registered.

In response to the paging request, paging exchange 105 broadcasts an incoming-call-indicative paging signal containing the pager number provided by adjunct processor 104 and an incoming-call-indication code, at step 330. Pager 122 receives the paging signal and recognizes its pager number, at step 332, and in response it alerts user 123, at step 400 of FIG. 4. Depending upon the type of pager it is, it may either generate a special tone that signifies an incoming-call indication, or generate a common alerting tone accompanied by displaying an incoming-call indication on the pager's display. If user 123 responds to the alert by turning on cellular phone 121, at step 402, cellular phone 121 automatically undergoes a conventional registration procedure with base station 109 that serves cell 119 in which cellular phone 121 is presently located, at step 404, and so becomes able to receive the incoming call. In response to the registration, base station 109 notifies MTSO 103 thereof, at step 406, and MTSO 103 in turn notifies NCP 102, at step 420, causing NCP 102 to update its records for cellular phone 121 accordingly, at step 422.

In the meantime, adjunct processor 104 periodically polls NCP 102 for the status of cellular phone 121, at step 410. Until cellular phone 121 registers with a base station, NCP 102 replies to the poll with an indication that cellular phone 121 is not registered, at step 414. In response to the indication of non-registration, at step 414, adjunct processor 104 repeats polling of NCP 102 at step 410 until the timer that adjunct processor 104 had started at step 328 of FIG. 3 times out, at step 416. If cellular phone 121 registers with a base station and NCP 102 is informed thereof at step 422 before the timer times out at step 416, NCP 102 replies to a poll at step 410 with an indication that cellular phone 121 is registered and an identification of base station 109 with which cellular phone 121 is registered, at step 424. In response to this indication, at step 414, adjunct processor 104 turns off the timer that it had started at step 328, at step 430, and transfers the call back to MTSO 103, at step 432. MTSO 103 responds thereto by attempting to extend (i.e., connect) the call to cellular phone 121 in the conventional manner, at step 434, as if MTSO 103 had just received the call.

Returning to step 416, if cellular phone 121 does not register with a base station before the timer times out, adjunct processor 104 sends an alternative destination query to NCP 102, at step 440. NCP 102 responds by checking the coverage path of cellular phone 121 to determine if any alternative destinations other than adjunct processor 104, are specified therein, at step 442, and informs adjunct processor 104 accordingly, at step 444. If there is an alternative destination specified for calls to cellular phone 121, as determined at step 446, adjunct processor 104 plays an announcement to the caller on the held call informing the caller that the called party could not be reached and that the call is being routed to an alternative destination, at step 448. Adjunct processor 104 then sends a request to MTSO 103 to transfer the call to the alternative destination, at step 450. MTSO 103 does so, at step 452, and continues to process the call in the conventional manner, at step 454.

Returning to step 446, if it is determined there that an alternative destination is not specified for calls to cellular phone 121, adjunct processor 104 plays an announcement to the caller on the held call informing the caller that the called party could not be reached and that the call is being terminated, at step 460. Adjunct processor 104 then hangs up the call, at step 462.

Returning to step 416, if cellular phone 121 does not register with a base station before the timer times out, adjunct processor 104 may alternatively dispense with trying to find an alternative destination for the call and proceed directly to steps 460 et seq., as indicated by the dashed line in FIG. 4.

Figure 5:
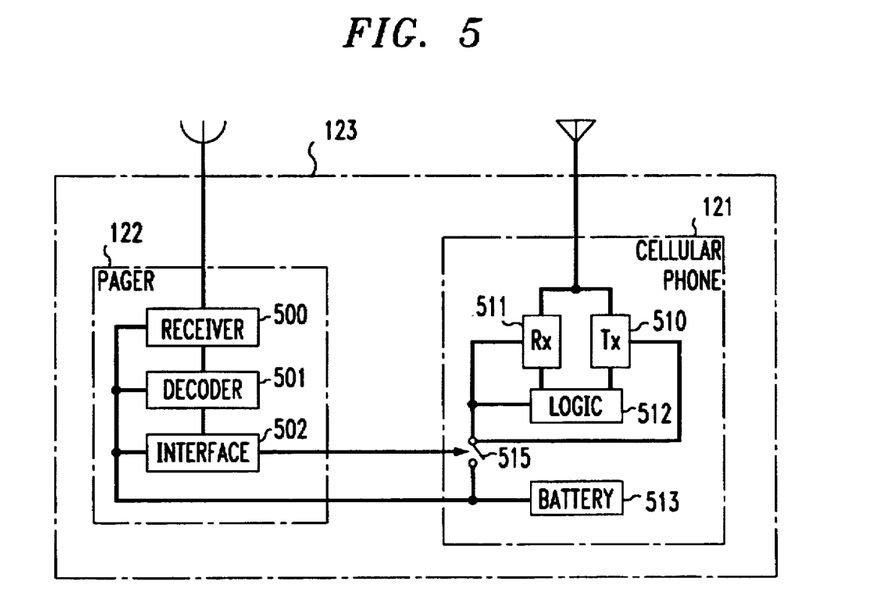
FIG. 5 is a block diagram of an integrated cellular radiotelephone and pager of the system of FIG. 1 constructed according to a second illustrative embodiment of the invention.

The just-described embodiment of the invention that is illustrated in FIGS. 3–4 relies on user 123 to respond to the paging alert and turn on cellular phone 121. But it is preferable that this function be performed automatically. According to a second embodiment of the invention, therefore, user 123 is equipped with a pager 122 and cellular phone 121 that are integrated into a single unit, as shown in FIG. 5. Cellular phone 121 is substantially conventional, but for the presence of a pager-controlled switch 515. Cellular phone 121 includes a transmitter 510 and a receiver 511 operating under control of cellular phone logic 512 and powered by a battery 513. Circuits 510–512 are connected to battery 513 through switch 515 which is controlled by pager 122. Pager 122 includes a conventional paging receiver 500 connected to a conventional paging decoder 501. According to the invention, pager 122 further includes interface circuitry 502 that operates switch 515 under control of decoder 501. Circuits 500–502 are illustratively powered by battery 513, and are always turned on. When decoder 501 decodes a received incoming-call indication, it not only alerts user 123 thereof but also causes interface circuitry 502 to close switch 515, thereby connecting circuits 510–512 to battery 513 and turning cellular phone 121 on. This causes cellular phone 121 to undergo registration and thus become able to receive the incoming call. And when decoder 501 decodes a received power turn-off indication, it causes interface circuitry 502 to open switch 515, thereby disconnecting circuits 510–512 from battery 513 and turning cellular phone 121 off, whereby cellular phone 121 again becomes unable to receive incoming calls.

In this embodiment of the invention, the initial handling of a call incoming for cellular phone 121 is the same as in the first embodiment and shown in FIG. 3. However, when pager 122 receives and recognizes the incoming-call-indicating paging signal at step 332 of FIG. 3, it responds by turning on cellular phone 121, at step 600 of FIG. 6. In response, cellular phone 121 automatically undergoes registration with base station 109 that serves cell 119 in which cellular phone 121 is presently located, at step 604. Base station 109 notifies MTSO 103 of the registration, at step 606, and MTSO 103 in turn notifies NCP 102, at step 620, causing NCP 102 to update its records for cellular phone 121 accordingly, at step 622.

Figure 6:
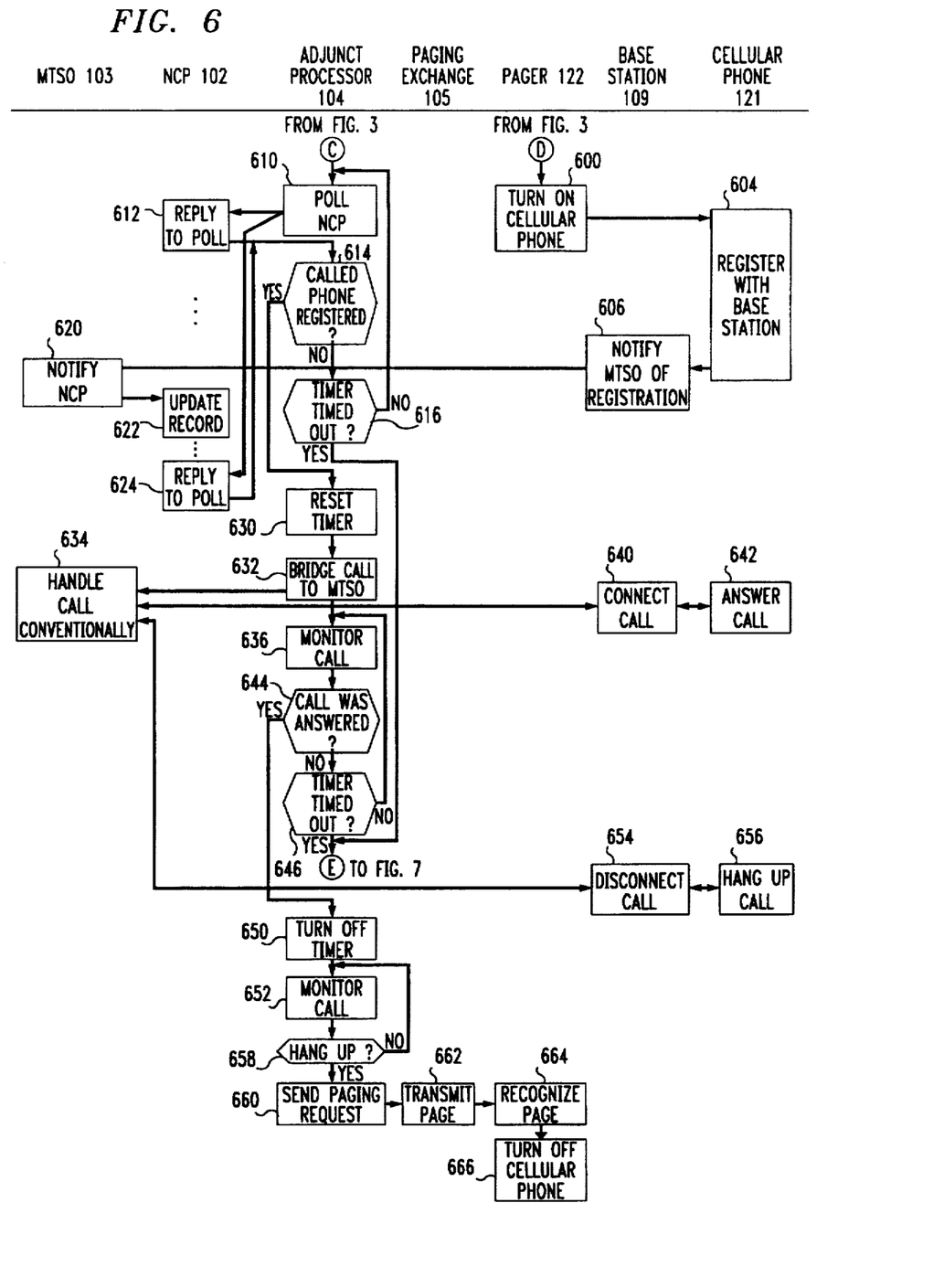

In the meantime, adjunct processor 104 periodically polls NCP 102 for the status of cellular phone 121, at step 610. Until cellular phone 121 registers with a base station, NCP 102 replies to the poll with an indication that cellular phone 121 is not registered, at step 614. In response to the indication of non-registration, at step 614, adjunct processor 104 repeats polling of NCP 102 at step 610 until the timer that adjunct processor 104 had started at step 328 of FIG. 3 times out, at step 616. If cellular phone 121 registers with a base station and NCP 102 is informed thereof at step 622 before the timer times out at step 616, NCP 102 replies to a poll at step 610 with an indication that cellular phone 121 is registered and an identification of base station 109 with which cellular phone 121 is registered, at step 624. In response to this indication, at step 614, adjunct processor 104 resets the timer that it had started at step 328, at step 630. The timer now begins to time an interval during which cellular phone 121 must answer the call. Adjunct processor 104 also bridges the call back to MTSO 103, at step 632. This results in the call being connected back to MTSO 103 through adjunct processor 104, thereby allowing adjunct processor 104 to monitor the call, at step 636. MTSO 103 responds to the bridged call as if it had just received the call, and attempts to connect the call to cellular phone 121 in the conventional manner, at step 634.

Adjunct processor 104 is monitoring the call, at step 636. If base station 109 connects the call to cellular phone 121 at step 640, and cellular phone 121 answers the call, at step 642, before the timer that adjunct processor 104 had reset at step 630 times out, at step 646, adjunct processor 104 detects the call answer, at step 644. In response, adjunct processor 104 turns off the timer, at step 650, and continues to monitor the call, at step 652. When one of the parties to the call hangs up the call, e.g., at step 656, and base station 109 proceeds to disconnect the call, at step 654, adjunct processor 104 detects this condition, at step 658. In response, adjunct processor 104 sends a power turn-off paging request for the pager number of pager 122 to paging exchange 105, at step 660. Paging exchange 105 responds by broadcasting the request via a paging signal, at step 662. Pager 122 receives and recognizes the paging signal, at step 664, and responds thereto by turning off cellular phone 121, at step 666.

Figure 7:
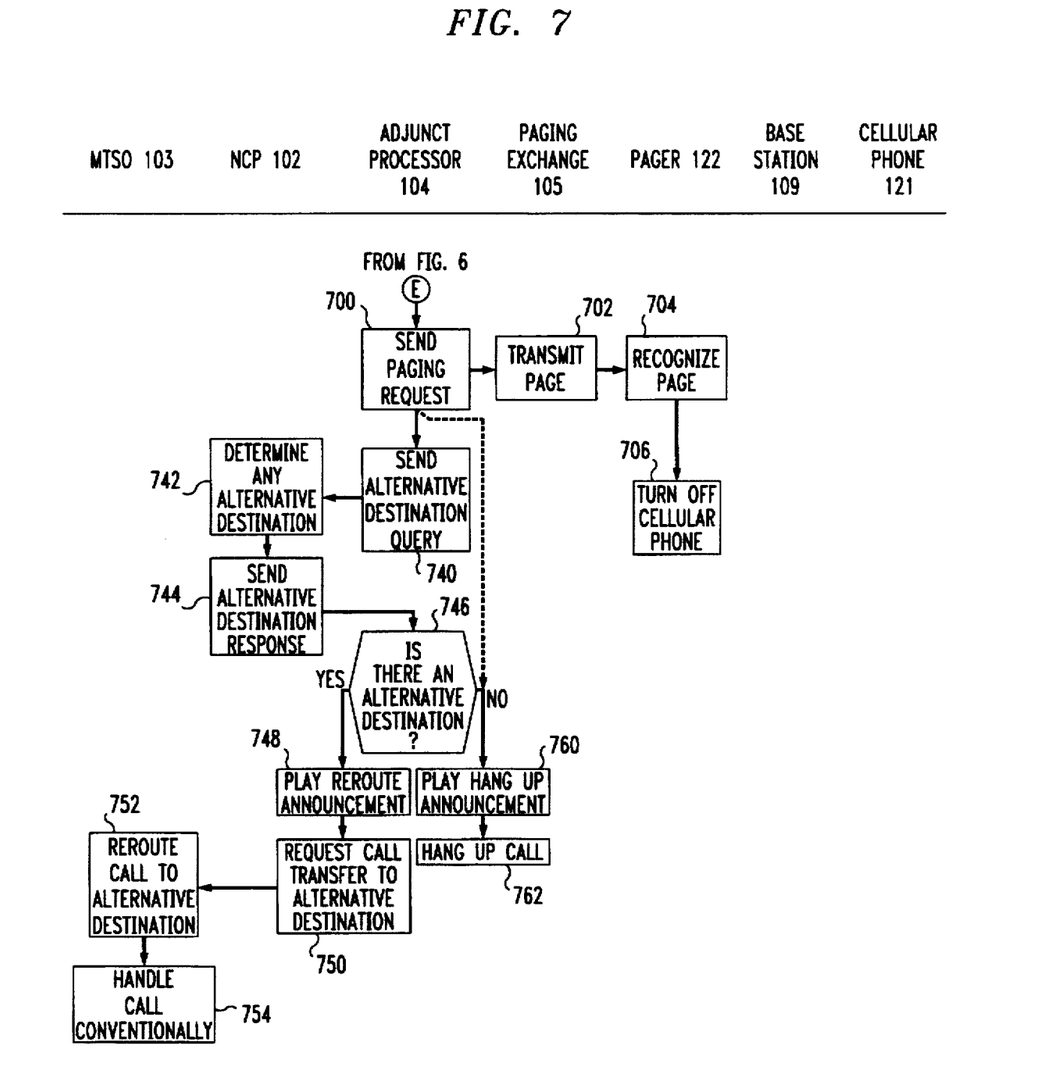

Returning to step 646, if the timer that was reset at step 630 times out before adjunct processor 104 detects that cellular phone 121 answered the call, adjunct processor 104 sends a power turn-off paging request for the pager number of pager 122 to paging exchange 105, at step 700 of FIG. 7. Paging exchange 105 responds by broadcasting the request via a paging signal, at step 702. Pager 122 receives and recognizes the paging signal, at step 704, and responds thereto by turning off cellular phone 121, at step 706. Adjunct processor 104 then proceeds, at steps 740–762, to treat the call in the identical manner as described above for steps 440–462, respectively, of FIG. 4.

Of course, various changes and modifications to the illustrative embodiments described above will be apparent to those skilled in the art. For example, the service may be extended to be used in conjunction with any device (e.g., fax machine, cellular modem) for the purpose of turning on and off and/or reprogramming the device via the paging network. Also the service can be implemented in a cellular radiotelephone system without the need for a separate paging system, if the cellular system implements a paging-like capability (e.g., a "short message" capability). Such changes and modifications can be made without departing from the spirit and the scope of the invention and without diminishing its attendant advantages. It is therefore intended that such changes and modifications be covered by the following claims.

The invention claimed is:

1. A wireless call completion method comprising the steps of:
   in response to a call incoming for a wireless radiotelephone, transmitting a paging signal to a pager associated with the wireless radiotelephone,
   the step of transmitting comprising the steps of
      in response to the incoming call, determining whether the wireless radiotelephone is registered wit h any base station, and
      in response to determining that the wireless radiotelephone is not registered with any base station, transmitting the paging signal to the page;
   in response to receiving the paging signal at the pager, enabling the wireless radiotelephone to receive the incoming call,
   the step of enabling comprising the steps of
      causing the wireless radiotelephone to register with a base station,
      wherein the step of causing comprises the steps of
         activating the wireless radiotelephone; and
         in response to the activation, the wireless radiotelephone registering with the base station; and
      subsequently to the transmitting paging signal, extending the incoming call to the enabled wireless radiotelephone,
   the step of extending comprising the step of
      extending the incoming call to the registered wireless radiotelephone through the base station with which the wireless radiotelephone is registered, and further comprising the steps of:
         in response to either (a) the extended incoming call not being answered at the wireless radiotelephone or (b) the extended incoming call being answered at the wireless radiotelephone and subsequently being terminated, transmitting a second paging signal to the pager; and
         in response to receiving the second paging signal at the pager deactivating the wireless radiotelephone.

2. A wireless call completion method comprising the steps of:
   in response to a call incoming for a wireless radiotelephone, attempting to extend the call to a wireless radiotelephone,
      the step of attempting to extend the call comprising the step of
         determining whether the wireless radiotelephone is registered with any base station;
   in response to failure of the attempt, transmitting a paging signal to a pager associated with the wireless radiotelephone,
   the step of transmitting being performed in response to determining that the wireless radiotelephone is not registered with any base station;
   in response to receipt of the paging signal by the pager, enabling the wireless radiotelephone to receive incoming calls,
   the step of enabling comprising the step of
      causing the wireless radiotelephone to register with a base station; and
   subsequently to the transmitting of the paging signal, attempting again to extend the incoming call to the wireless radiotelephone,
   the step of attempting again to extend the call comprising the steps of
      in response to registering, extending the incoming call to the wireless radiotelephone via the base station with which the wireless radiotelephone is registered;
      in response to either (a) the extended incoming call not being answered at the wireless radiotelephone or (b) the extended incoming call being answered at the wireless radiotelephone and subsequently being terminated transmitting a second paging signal to the pager; and
      in response to receiving the paging signal at the pager, deactivating the wireless radiotelephone.

3. A wireless call completion method comprising the steps of:
   in response to a call incoming for a cellular telephone to a cellular call exchange, determining whether the cellular telephone is registered with a cellular base station;
   in response to determining that the cellular telephone is not registered, transmitting a paging signal to a pager associated with the cellular telephone;
   in response to receiving the paging signal at the pager, activating the cellular telephone;
   in response to being activated, the cellular telephone registering with a cellular base station;
   in response to the registering, extending the incoming call from the cellular exchange to the cellular telephone through the base station with which the cellular telephone is registered;
   in response to either (a) the extended incoming call not being answered at the cellular telephone or (b) the extended incoming call being answered at the cellular telephone and subsequently being terminated, transmitting a second paging signal to the pager; and
   in response to receiving the paging signal at the pager, deactivating the cellular telephone.

4. A telecommunications system comprising:
   a selectively-enabled wireless radiotelephone;
   a pager exchange for transmitting pager signals to the pager;
   a wireless call exchange for extending calls incoming for wireless radiotelephones to enabled said wireless radiotelephones;
   means responsive to a call incoming for wireless radiotelephones to enabled said wireless radiotelephones; and
   means responsive to a call incoming for the wireless radiotelephone into the wireless call exchange, for causing the paging exchange to transmit a paging signal to the pager, the paging signal being such that receipt of the paging signal at the pager results in enablement of the wireless radiotelephone to receive the incoming call; and
   one or more base stations for wirelessly communicating with wireless radiotelephones; wherein
      the wireless call exchange responds to the incoming call by determining whether the wireless radiotelephone is registered with any base station the causing means responds to a determination that the wireless radiotelephone is not registered with any base station by causing the paging exchange to transmit the paging signal, the causing means including means responsive to either (a) the extended incoming call not being answered at the wireless radiotelephone or (b) the extended incoming call being answered at the wireless radiotelephone and subsequently being terminated, for causing the paging exchange to transmit a second paging signal to the pager, the second paging signal being such that receipt of the second paging signal at the pager results in disablement of the wireless radiotelephone, the wireless radiotelephone responds to its enablement by registering with a base station of the one or more base stations, and the wireless call exchange responds to the registering by extending the incoming call to the registered wireless radiotelephone through the base station with which the wireless radiotelephone is registered.

5. A telecommunications system comprising:

a selectively-enabled wireless radiotelephone;

a pager exchange for transmitting pager signals to the pager;

a wireless call exchange for extending calls incoming for wireless radiotelephones to enable said wireless radiotelephones; and means responsive to a call incoming for wireless radiotelephones to enable said wireless radiotelephones;

means responsive to a call incoming for the wireless radiotelephone into the wireless call exchange for causing the paging exchange to transmit a paging signal to the pager, the paging signal being such that receipt of the paging signal at the pager results in enablement of the wireless radiotelephone to receive the incoming call; and means interconnecting the pager with the wireless radiotelephone, responsive to receipt of a first said paging signal at the pager for enabling the wireless radiotelephone, and further responsive to receipt of the second paging signal at the pager for disabling the wireless radiotelephone.

6. a wireless radiotelephone system for use with wireless radiotelephone including a selectively-activatable wireless radiotelephone, comprising:

a wireless call exchange for attempting to extend the calls incoming for the wireless radiotelephones to the wireless radiotelephones and extending the calls incoming for the wireless radiotelephones to activated said wireless radiotelephones, the wireless call exchange attempting to extend the incoming call to the wireless radiotelephone, by determining whether the wireless radiotelephone is registered with any base station;

the wireless radiotelephone is being responsive to being activated, by registering with a base station;

means responsive to failure of an attempt by the wireless call exchange to extend a call incoming into the wireless call exchange for the wireless radiotelephone, for causing a paging system to transmit a paging signal to a pager that is associated with the wireless radiotelephone, the paging signal being such that receipt of the paging signal at the pager results in activation of the wireless radiotelephone;

the causing means being responsive to a determination that the wireless radiotelephone is not registered with any base station, by causing the paging system to transmit the paging signal; wherein the wireless call exchange attempts subsequently to the transmitting of the paging signal to again extend the incoming call to the wireless radiotelephone, the wireless call exchange responding to the registration, by extending the incoming call to the wireless telephone via the base station with which the wireless radiotelephone is registered; and the causing means include means responsive to either (a) the extended incoming call not being answered at the wireless radiotelephone or (b) the extended incoming call being answered at the wireless radiotelephone and subsequently being terminated, for transmitting a second paging signal to the pager, the second paging signal being such that receipt of the second paging signal at the pager results in deactivation of the wireless radiotelephone.

7. An apparatus for use with cellular telephones, including a selectively-activatable cellular telephone, at least one base station for wirelessly communicating with the cellular telephones, a cellular call exchange for extending incoming calls to cellular telephones that are registered with base stations through the base stations with which they are registered, a pager associated with the selectively-activatable cellular telephone, and a paging system for transmitting paging signals to the pager, the apparatus comprising:

means responsive to a call incoming for the selectively-activatable cellular telephone to the cellular call exchange and a determination by the cellular call exchange that the selectively-activatable cellular telephone is not registered with any base station, for causing the paging system to transmit a first paging signal to the pager, the first paging signal being such that receipt of the first paging signal at the pager results in activation of the selectively-activatable cellular telephone and registration of the activated selectively-activatable cellular telephone and registration of the activated selectively-activatable cellular telephone with a base station;

means for determining whether the selectively-activatable cellular telephone has registered with a base station subsequently to transmitting of the first paging signal;

means responsive to a determination by the determining means that the selectively-activatable cellular telephone has registered with a base station, for selectively-activatable cellular telephone has registered with a base station, for causing the cellular call exchange to extend the incoming call to the selectively-activatable cellular telephone; and means responsive to either (a) the extended incoming call not being answered at the selectively-activatable cellular telephone or (b) the extended incoming call being answered at the cellular telephone and subsequently being terminated, for causing the paging system to transmit a second paging signal to the pager, the second paging signal being such that receipt of the second paging signal at the pager results in deactivation of the selectively-activatable cellular telephone.

8. The apparatus of claim 7 wherein:

the means for causing the paging system to transmit a second paging signal include means for monitoring the incoming call by bridging onto the incoming call.

* * * * *